Aug. 15, 1939     C. W. VOGT     2,169,573
CONTAINER FILLER FOR LIQUIDS
Filed Feb. 27, 1936     4 Sheets-Sheet 1
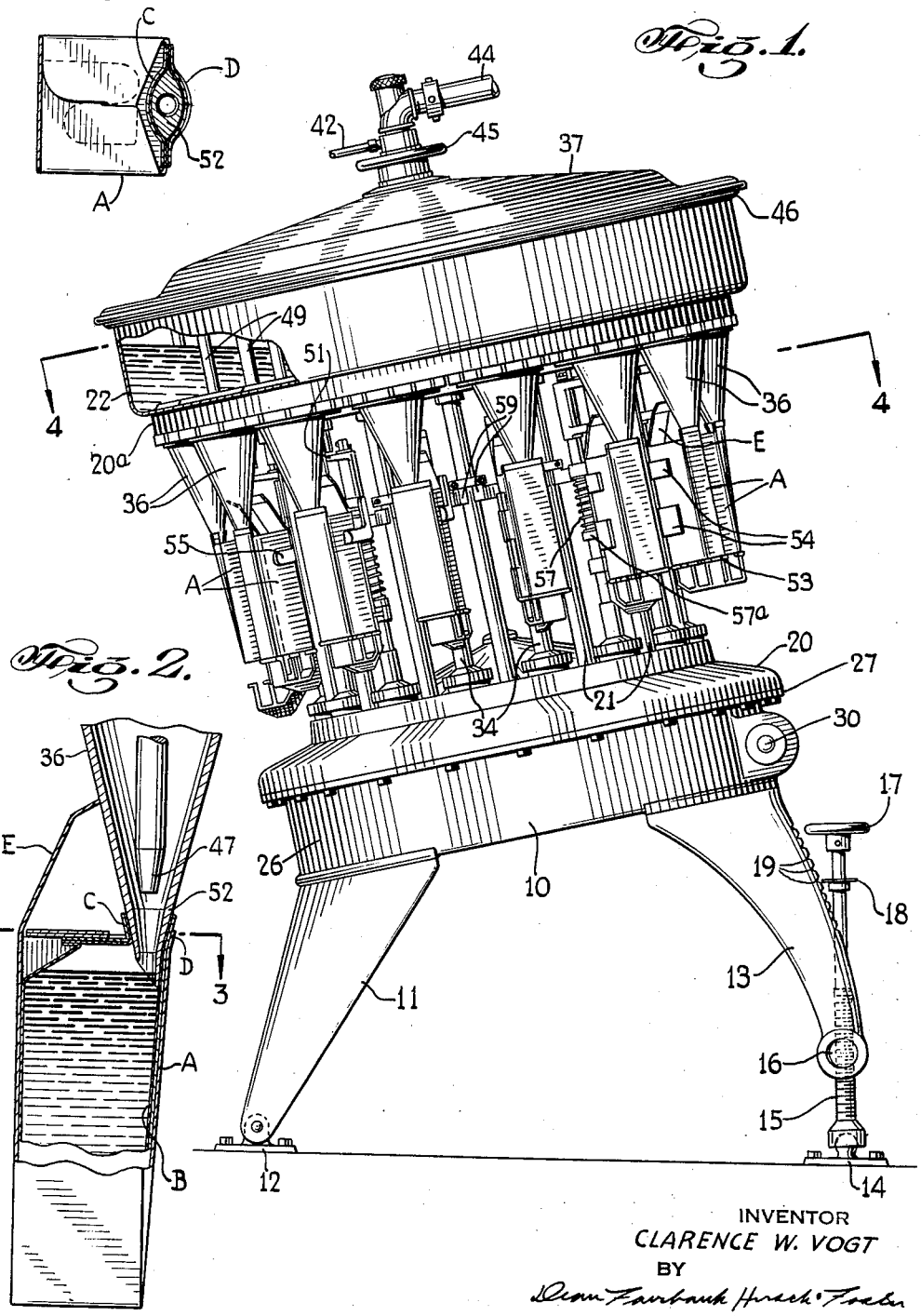
INVENTOR
CLARENCE W. VOGT
BY
ATTORNEYS

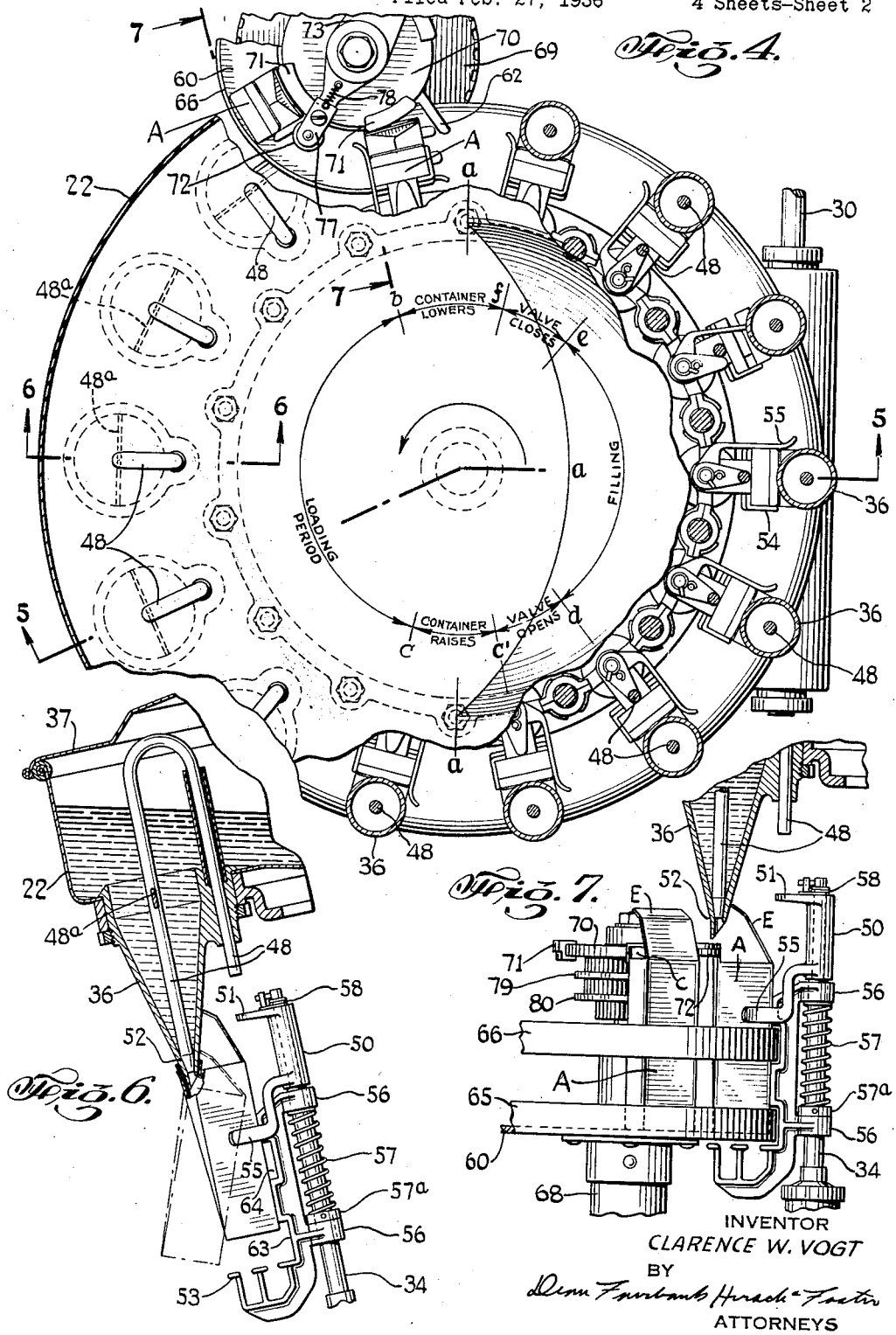
Aug. 15, 1939  C. W. VOGT  2,169,573
CONTAINER FILLER FOR LIQUIDS
Filed Feb. 27, 1936  4 Sheets-Sheet 2
INVENTOR
CLARENCE W. VOGT
BY
ATTORNEYS

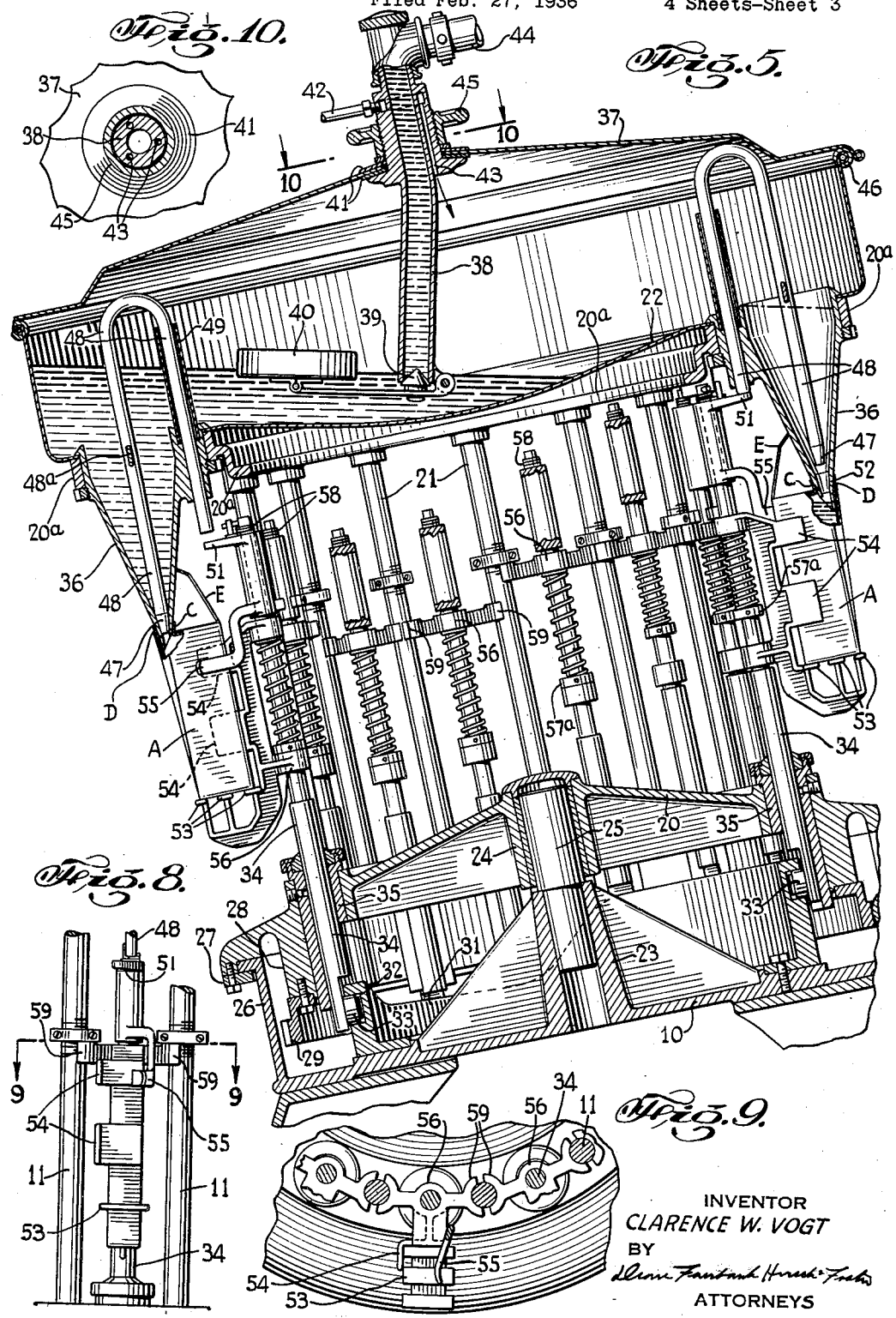

Aug. 15, 1939     C. W. VOGT     2,169,573
CONTAINER FILLER FOR LIQUIDS
Filed Feb. 27, 1936     4 Sheets-Sheet 4
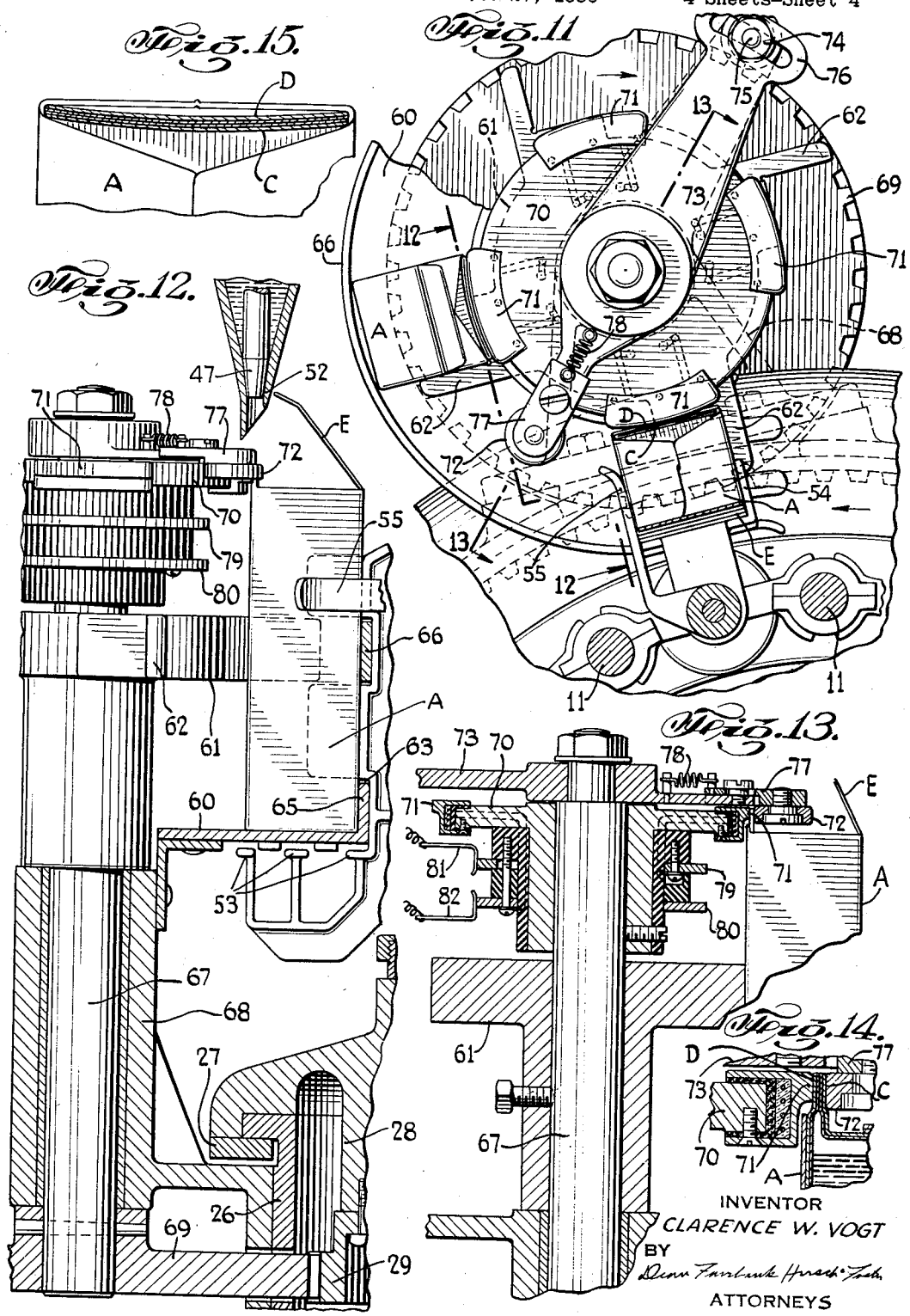
INVENTOR
CLARENCE W. VOGT
BY
ATTORNEYS Patented Aug. 15, 1939

2,169,573

UNITED STATES PATENT OFFICE 2,169,573

CONTAINER FILLER FOR LIQUIDS

Clarence W. Vogt, New York, N. Y., assignor, by mesne assignments, to Owens-Illinois Glass Company, Toledo, Ohio, a corporation of Ohio Application February 27, 1936, Serial No. 65,953

8 Claims. (Cl. 226—97)

This invention relates to machines for filling containers with liquids, and more particularly to that type in which a series of containers may be fed in succession in proper relationship to the filling apparatus and filled and sealed while in transit.

In my improved machine there is provided a plurality of measuring chambers filled in succession and permitted to discharge in succession into separate successive containers so that there will be a predetermined amount of liquid delivered to each container regardless of any possible slight variation in the size of the containers. In the use of a machine of this character the amount of liquid delivered from a filled measuring chamber within the allotted time and after the opening of the discharge valve, will vary dependent upon the viscosity of the liquid or the extent to which it tends to adhere to the wall of the chamber. Even though the measuring chamber be completely filled before the discharge valve is opened, this amount will vary with the meniscus of the liquid, and upon opening the discharge valve the amount of liquid delivered may vary dependent upon the amount of liquid which adheres to the wall or which flows only slowly over or from said wall.

The main object of the present invention is to provide a very simple and effective means whereby the amount of liquid in the measuring chambers may be varied at will and in accordance with the viscosity or other characteristic of the liquid.

It has been proposed to use compensating mechanism in connection with each chamber to control the volume of liquid therein.

In my improved apparatus I avoid the use of any such compensating mechanism and automatically control the liquid content of each measuring chamber without the necessity for any moving parts associated with the chamber.

In my improved apparatus the measuring chambers and the containers travel in a circular path, and the axis of rotation of the main moving parts of the apparatus is inclined from the vertical to such an extent that during one part of the path of movement of the measuring chambers they move into a main body of liquid so as to become filled, and at another part of the path of movement they are at least in part above the level of the liquid in said body.

As an important feature of my invention I provide means whereby the measuring chambers, while above the level of the body of liquid supply, will be tilted to the desired degree, and the amount of liquid in each chamber determined by the extent of such tilting. Thus for a highly viscous liquid there may be a smaller tilt than for a less viscous liquid, and as a result the larger amount of more viscous liquid in the measuring chamber when the discharge valve is open will compensate for the larger amount of such viscous liquid which will adhere to the wall. For a thinner or less viscous liquid, all of which freely flows from the measuring chamber, the latter would be tilted to a greater degree so that there will be a smaller initial supply.

As a further important feature all of the measuring chambers are rigidly connected to the main rotating frame of the machine, the axis of the entire machine being tilted so as to simultaneously tilt all of the measuring chambers to the desired degree.

As examples of liquids of different viscosity, different meniscuses, or which adhere to the walls of the measuring chamber to a different degree, I may mention cream and milk, or lubricating oils of different grades. For each liquid there would be a predetermined angle of inclination to insure the delivery of a uniform amount of the liquid.

So far as concerns the main feature of my invention, the apparatus may be designed for delivering a predetermined amount of liquid to any desired type of container, such as a bottle, can, carton, bag or the like. In the preferred form hereinafter described, the apparatus is designed for filling the type of container disclosed and claimed in copending application Serial No. 43,995, in which the liquid is retained by a thin flexible walled bag disposed in a carton and the bag has a flap or pleat comprising a pair of plies or walls normally disposed in closely juxtaposed parallel positions and which may be bent in opposite convex curves to form a filling opening therebetween. The delivery spout of the apparatus may be caused to enter the opening and hold the walls apart during filling.

As a further feature of my invention I provide means for sealing together the walls defining the filling opening after the predetermined volume of liquid has been delivered, said sealing means being operated by and timed with the mechanism for effecting the measuring and discharging operations.

The walls of the bag are preferably formed of a material capable of being heat sealed without the necessity of using adhesive or a separate closure member, and the sealing of the container is effected merely by heating and pressing together the walls of the flap as the filled container moves along after the removal of the spout from between said walls.

My improved machine embodies various other features of importance which will be pointed out more particularly hereinafter in connection with the description of a preferred embodiment of the invention.

In the drawings:

Fig. 1 is a side elevation of the machine, a portion of the wall of the supply tank being broken away, Fig. 2 is an enlarged vertical section showing a container in filling position in respect to the measuring chamber, Fig. 3 is a transverse section on the line 3—3 of Fig. 2, Fig. 4 is a top plan view, portions being broken away at different planes, Fig. 5 is a vertical section taken on the line 5—5 of Fig. 4, Fig. 6 is a detail showing the position of the container as it is brought into registry with the measuring chamber and taken on the line 6—6 of Fig. 4, Fig. 7 is a detail taken on the line 7—7 of Fig. 4 and showing the container and measuring chamber in another position, Fig. 8 is a face view of one of the container supports, Fig. 9 is a transverse section through a portion of the machine, said section being taken on the line 9—9 of Fig. 8, Fig. 10 is a sectional detail on the line 10—10 of Fig. 5, Fig. 11 is a top plan view of the sealing means shown at the upper side of Fig. 4, but on a large scale, Figs. 12 and 13 are sections on the lines 12—12 and 13—13 respectively of Fig. 11, Fig. 14 is a detail similar to a portion of Fig. 13, but on a larger scale showing the sealing parts, and Fig. 15 is a top plan view of the container, the flap or pleat being shown in section.

In the construction illustrated there is a base 10 provided with means whereby it may be tilted to a limited extent in respect to the horizontal. Preferably it has a three point support in the form of a pair of legs 11 which may be pivoted on a bedplate 12 and a third leg 13 provided with means for raising or lowering the lower end thereof in respect to a bedplate 14. The adjusting means is shown as a screw rod 15 having a ball and socket connection with the bedplate 14 and threaded engagement with a trunnion 16 rotatably supported in the lower end of the leg 13. The screw rod 15 which forms an extension of the leg 13 may be rotated to vary the total effective length of the combined leg by means of a handle 17, and the angle of the resulting tilt may be indicated by a pointer disc 18 juxtaposed to a scale 19 on the side of the leg 13.

The base 10 serves to rotatably support the main frame of the machine. This frame is shown as including a base frame member 20, an annular series of upwardly extending rods 21, and an upper supply tank 22. The base 10 and the frame member 20 are connected so as to permit this rotation. As shown the base has a central upwardly facing socket 23, and the frame member 20 has a central downwardly facing socket 24 receiving an axle or pivot rod 25. The base 10 and the frame member 20 cooperate to form a casing for the means employed to rotate the main frame and to control the liquid delivery valves.

The base is shown as having an upwardly extending peripheral flange 26, and the frame 20 is provided with an inwardly extending flange 27, the parts 26 and 27 cooperating to permit rotation of the parts 10 and 20, but normally prevent relative vertical movement.

The frame member 20 has a depending flange 28 within the casing and provided with a worm wheel 29 which engages a worm on a transverse shaft 30 journaled in the wall 26 at one side thereof. Thus by rotating the shaft 30 the frame 20 and all parts carried thereby are rotated about the pivot 25 as a center. The shaft 30 may be driven by a flexible shaft or by a motor mounted on the bottom of the gear casing and connected by a variable speed drive.

Within the casing there is also provided an annular cam flange 31 mounted on the base 20 and provided with a peripheral cam groove 32 in which travel rollers 33 secured to rods 34 vertically slidable in suitable bearings or guides 35 in the frame member 20.

The supply tank 22 is mounted on an upper frame member 20a which, in turn, is supported from and rigidly secured to the lower frame member 20 by the vertical rods 21. Preferably these rods are shouldered at each end to seat on the two frame members 20 and 20a, and the parts are rigidly connected by nuts on the ends of the rods. The tank is of light sheet metal and carries a series of depending measuring chamber 36, each of which is open at its upper end into the supply tank. Means are provided for maintaining a fairly definite liquid level within the supply tank and this level is such that due to the inclination of the axis 25 the measuring chambers will have their upper ends below the liquid level during a part of their path of movement around the axis and will have their upper ends above said liquid level at another portion of the path of movement. Thus during the rotation each measuring chamber will pass beneath the liquid so that it will be filled and will then pass above the liquid level.

Any suitable means may be employed for maintaining this liquid level. As shown the tank 22 is provided with a cover 37 and through the center of the latter extends a delivery pipe 38 having a float controlled valve 39 at the lower end thereof. The pipe is preferably held against rotation so that the float 40 will remain on the downwardly inclined side of the center of rotation.

If it is desired to employ gas pressure for facilitating the rapid delivery of the liquid from the measuring chambers the tank 22 may be gas tight. As shown the pipe 38 has packing gaskets 41 engaging the upper and lower surfaces of the cover 37 to form a substantially gas tight seal, and the upper end of the pipe 38 is provided with a gas supply pipe 42 communicating with a passage 43 leading to the interior of the tank. The pipe may be held against rotation not only by the pipe 42, but by the liquid supply pipe 44 connected to and extending at right angles from the upper end of the pipe 38. Additional means may be employed for preventing rotation if desired, and the packing gaskets 41 may be adjusted by a collar 45 threaded on the portion of the pipe 38 above the cover. The peripheral edge of the cover may be sealed to the peripheral wall of the tank by a suitable gasket 46.

The upper end of each measuring chamber is preferably in a plane at right angles to the axis of rotation and therefore as each measuring receptacle is filled and moves above the liquid level the liquid in the chamber will be at the same angle in respect to the upper edge of the chamber as is the axis of rotation in respect to the vertical. With the axis substantially vertical each measuring chamber will be substantially completely filled, but the greater the inclination the more of the liquid can flow out over the edge of the chamber and the less will be the quantity remaining therein. This variation in quantity will vary with the area of the upper surface of the liquid in the measuring chamber.

I do not desire to be limited to any specific shape of measuring chamber, but I preferably employ one which is comparatively large at its upper end so that comparatively small changes in inclination will give comparatively larger variations in the amount of liquid in the measuring chamber.

Preferably the measuring chambers are substantially conical with their largest end uppermost. This shape also facilitates the rapid discharge of the liquid from the measuring chamber when the valve at the lower end of the chamber is opened.

For controlling the discharge of the liquid from the measuring chamber a simple form of valve is a conical plug 47 vertically movable within the measuring chamber and adapted to fit in a valve seat or in the lower end of the conical chamber. Such a valve plug may be connected to a rod 48 extending up into the tank 22 above the liquid level therein and thence down through a guide tube 49 and the bottom of the tank. The rod 48 may be held in a central position in the chamber by a cross guide 48a extending at right angles to the plane of the rod and guide 49. A separate cam operated rod 34 is provided for each measuring chamber and upon the upper end of each rod there is provided a sleeve 50 with a projection 51 which may be moved into or out of alignment with the end of the valve rod 48 so that when the rod is lifted the projection 51 will engage the valve rod and lift the valve from its seat so that the liquid may discharge through the lower end of the chamber, which by reason of the conical form constitutes a delivery spout or nozzle 52.

Each of the vertically movable rods 34 serves not only for opening the valve, but also for supporting the container to be filled. I do not wish to be limited to any specific type of container as my improved apparatus may be employed for filling glass bottles, tin cans, or any other form of liquid storage or shipping vessel, but for purposes of illustration I have shown my improved apparatus for use in filling containers of the type disclosed and claimed in my copending application Serial No. 43,995. Such a container includes a carton A having an inner lining of flexible slightly stretchable impervious sheet material B which latter is so designed as to form a flap which may extend upwardly with two closely juxtaposed parallel walls C and D. The container may be filled by separating these two flaps and extending the nozzle end 52 between the two walls of the flap as shown particularly in Figs. 2 and 3. When the predetermined amount of liquid has been delivered into the container and the latter removed from the filling nozzle 52 the two walls of the flap will come together and may be folded down and retained in folded position by the cover flap E of the carton.

Each valve operating and receptacle carrying rod 34 is provided with a support 53 for the container, one or more side clamps or guides 54 and an opposed cam or guide 55. The guide 55 is connected to the sleeve 50 which carries the valve operating member 51. In placing the container into position to be filled the filling opening of the container is telescoped onto the nozzle 52 and the clamp 55 is moved to one side and the container held between the clamps 54 and 55, and preferably spaced above the support 53 as shown in Fig. 6.

During the rotation of the apparatus the cam groove at the proper time raises the rod 34 until the support 53 contacts with the bottom of the container and the valve operating member 51 raises the valve. Each container support 53 is provided with a collar 56 which is slidable upon the rod 34 and is normally held in an upper limiting position by a coil spring 57, the lower end of which bears against the upper surface of a collar 57a which is fixed to shafts 34 by a pin or set screw. After the container support 53 has engaged the bottom of the container and has moved it upwardly to the position shown in Fig. 2 where the upper rim of the nozzle is snugly socketed within the container opening, the further upward movement of the rod will result in compression of the spring so that there will be no breaking, jamming or distortion of the container.

The sleeve 50 is rotatable to a limited extent on the upper end of the rod 34 and is normally held in a predetermined position by a torsion spring 58. If there is no container in place between the clamps 54 and 55 then the spring 58 will hold the sleeve 50 in such position that the valve operating member 51 is out of alignment with the valve rod 48 and the valve is not opened during the upward movement of the rod 34. The placing of a container between the clamps 54 and 55 automatically rotates the sleeve 50 to such a position that when the rod 34 comes up the valve will be opened.

The rods 21 which support the supply tank 22 also serve as guides for the upper ends of the rods 34. The upper collar 56 of the container support may be provided with lateral extensions 59 slidable along the opposite juxtaposed rods 21 as shown particularly in Fig. 5.

Although the containers are preferably placed in position by hand it will be evident that means might be provided for automatically delivering them to the rotating apparatus as each measuring chamber reaches a predetermined position in its path of movement. Preferably suitable means are provided for removing the containers from the apparatus after they have been filled. I have illustrated such a mechanism in Figs. 4 and 7. As each filled container reaches a predetermined position in the path of movement, the container support is lowered and the valve closed. Due to the weight of the filled container it will move downwardly with the container support and out of engagement with the delivery spout. Just beyond this point in the path of movement there is provided a curved channel shaped guide 60 into which the containers enter and along which they are moved to a limited extent by the clamp member 54 until they are disengaged from the latter due to the reverse curvature of the guide 60 and the path of movement of the container support. As the containers are disengaged from the container support they are moved along the channel shaped guide 60 by suitable conveying means, such for instance as a wheel 61 having fingers 62 projecting into and movable along the guide 60. The reciprocating slide of the container support 53 may have a pair of recesses 63 and 64 into which the bars 65 and 66 forming the outer wall of the delivery guide 60 may enter so as to insure the proper positioning of the container in the guide before the container leaves its support and clamping means.

The wheel 61 is mounted on a shaft 67 journaled in a bracket 68 carried by the wall 26 of the gear casing. The lower end of the shaft carries a gear 69 meshing with the main gear 29.

The apparatus illustrated is designed and proportioned for filling containers of the type shown in my application above referred to and is provided with means for sealing together the two juxtaposed walls or plies C and D. These walls are laminated, the inner layer of each being of a heat sealing material, such as "pliofilm", and the outer layer of each being of paper or the like.

As the container is lowered and removed from the nozzle these walls come together in parallel positions as shown in Fig. 15 with the flap remaining in an upstanding or substantially vertical position and approximately in the plane of the outer side walls of the container.

For sealing these walls of the flap or pleat together, the shaft 67 above the wheel 61 is provided with a disc or head 70 having heated shoes, plates or contact members 71 each of a length and height approximately that of the flap to be sealed, and properly positioned in respect to the fingers 62 that they contact the outer surface of the outer wall D of the flap as the container is being carried along by the wheel.

At one point in the path of travel of the container is a member for engaging the surface of the other wall C and pressing the walls together against the heated member 71. This is preferably in the form of a roller 72 which may be carried by an arm 73 journaled on the upper end of the shaft 67 and normally locked in proper position by a nut 74 on a stationary bolt 75 carried by the bracket 68 and extending through an arcuate slot 76 in the end of the arm 73. The roller 72 is not secured directly to the arm 73 but is mounted in a bracket or extension 77 movable endwise of the arm and pulled toward an inner limiting position by a spring 78. Thus as each container is carried along with the wall D of the flap in contact with the heated member 71, the flap when it reaches the roller 72 has its two walls pressed together and pressed against the heater by the roller and spring, and the two walls are sealed together to hermetically seal the container. The outer layer of each wall is not softened or melted by the heat and pressure, but the heat and pressure are transmitted through the outer layers to soften and seal the inner layers together and to the outer layers. The outer layers protect the inner layers from direct contact with the pressing and sealing members.

Any suitable means may be employed for heating the contact members 71. As shown they are carried by but insulated from the disc 70 and each contains an electric heating element. The heating elements have their terminals connected to two collector rings 79, 80 which engage brushes 81, 82 connected to the source of electric current.

The cam groove 32 is of such shape as to effect the opening and closing of the valves at the proper points in the path of movement. The valves should close before the measuring chamber moves beneath the liquid level in the tank 22 and should open after the measuring chamber moves above said liquid level. The cam may be so formed as to close the valve with a dropping and slight jarring or even slight jamming action to insure tight closing and shaking off of the liquid in the nozzle below the valve. This eliminates the necessity for any dripping period in the cycle. Dripping might be prevented by a small teat or extension on the valve and loosely fitting the lower end of the nozzle to retain the liquid by capillary action. The empty containers are brought into position and the filled ones are delivered from the apparatus in the part of the path of movement in which the measuring chambers have their upper ends beneath the liquid level in the supply tank.

As an indication of the sequence of operations effected by means of the cam there is shown in Fig. 4 a line $a$ indicating the maximum liquid level in the supply container. The empty containers are brought into position while a measuring chamber moves through the arc represented by the line $b$—$c$ and are raised while in the arc $c$—$c'$. The valve opens in the arc $c$—$d$ and the containers are filled in the arc $d$—$e$. The valve is closed in the arc $e$—$f$, and the filled containers are lowered in the first part of the arc $f$—$b$ and discharged at the point $b$.

The container shown permits the filling to commence while the container is substantially in collapsed condition but open sufficiently to admit the tapered filling spout. This serves to reduce the head space necessary in the container for settling foam which would be produced by a relatively rapid filling rate. With either hand or mechanized filling it is merely necessary to slightly squeeze the body of the container and the flap automatically opens. The nozzle is preferably of such shape that it completely fills the space between the walls and prevents the entrance of air.

In the ordinary gravity milk bottle fillers in which vacuum is not employed, even though the milk bottle has a very large orifice, the filling is relatively slow due to the need for getting rid of the air and the foam which gets out usually through a small center tube of the filler valve. When a smaller amount of foam is present than usual, the liquid draining down from the inside of this filler valve causes an overfilling of the bottle and imperfect seating of the cap. Where a vacuum is used to remove this air and foam, considerable extra joints and mechanism are required which not only add to the expense of the filler but increase the difficulty of sterilizing and scrubbing the parts between runs.

Even with the gravity filler, the small double orifice in the center of the filling valve, and which extends above the liquid level in the filler bowl, presents a very definite source of bacterial contamination due to the difficulty in cleaning.

With my present invention, the filler nozzle, seating closely around the opening in the container and the container being substantially collapsed at the beginning of the fill, permits the use of a sufficiently large opening to give a very rapid fill without creating more foam than can be taken care of in the head space usually provided in a "non-measuring type container" (a glass bottle is a measuring type of container, although considerable variation is allowed under present regulations due to the inaccuracies in blowing and manufacturing the bottles). Specifically I have found that I can fill quart containers of this type with milk in three seconds through a ⅝" orifice. Contrasted to this there is a minimum of eight and usually as much as eleven seconds required to fill the usual quart size container because of the use of a small nozzle or permit the foam to escape or settle.

The particular machine above described is merely one embodiment of my invention, and all of the details thereof may be modified within comparatively wide limits without departing from the scope of my invention. The main features which are important are the provision of means whereby the amount of liquid in each measuring chamber at the time the discharge valve is opened is determined by the degree of tilt of the chamber, thus avoiding the necessity for compensating mechanism, and the sealing of the container by the application of heat and pressure to the flap.

Liquids varying in viscosity, meniscus characteristics and adhesion to chamber walls, through comparatively wide limits may be employed, and by merely varying the tilt of the apparatus the correct amount of liquid will be delivered while the valve is open even though the measuring chamber may contain a considerably greater volume of one kind of a liquid than it does of a liquid of a different kind.

The mechanism for closing and sealing the containers shown in the accompanying drawings and above described, is claimed in divisional application, Serial No. 257,925, filed February 23, 1939.

Having thus described my invention, what I claim as new and desire to secure by Letters Patent is:

1. A filling machine including a liquid supply chamber, a measuring chamber having a filling opening movable to positions below and above the liquid level in said supply chamber, and having a valve controlled discharge at the exterior of said supply chamber, means for tilting said measuring chamber to varying degrees to vary the volume of liquid retained by the measuring chamber when the filling opening is above the liquid level in the supply chamber, and means for opening said valve control discharge when said chamber reaches a predetermined point in its movement.

2. A filling machine having a supply chamber, an annular series of measuring chambers depending therefrom and having their open upper ends communicating with the interior of the supply chamber, means for maintaining a substantially constant liquid level within said supply chamber, means for rotating said supply chamber and measuring chambers about an axis inclined to the vertical, whereby the upper ends of the measuring chambers move in succession below and above said liquid level, and means for varying the inclination of said axis to vary the volume of liquid retained by each measuring chamber as it moves above said liquid level.

3. A filling apparatus including a rotatable frame having an upper supply chamber, an annular series of measuring chambers having inlet openings communicating with the interior of said supply chamber and having discharge outlets below said supply chamber, means for rotating said supply chamber about an axis inclined to the vertical, means for maintaining a liquid level in said supply chamber such that the inlet openings of said measuring chambers move below and above said liquid level during the rotation of said supply chamber about said axis, and means for varying the inclination of said axis to vary the amount of liquid retained in each measuring chamber as it moves above said liquid level.

4. A filling machine including a supply chamber rotatable about an axis inclined in respect to the vertical, a plurality of conical measuring chambers each having its larger upper end opening through the bottom of said supply chamber, a valve for controlling the discharge from the smaller lower ends of said measuring chambers, means for maintaining a liquid level within said supply chamber and below the uppermost part of the path of movement of the upper ends of said measuring chambers during the rotation of said supply chamber about said inclined axis, and means for varying the inclination of the axis of said supply chamber to control the amount of liquid retained in each measuring chamber.

5. A filling machine including a supply chamber rotatable about an axis inclined in respect to the vertical, a plurality of conical measuring chambers each having its larger upper end opening through the bottom of said supply chamber, a valve for controlling the discharge from the smaller lower ends of said measuring chambers, means for maintaining a liquid level within said supply chamber and below the uppermost part of the path of movement of the upper ends of said measuring chambers during the rotation of said supply chamber about said inclined axis, means for varying the inclination of the axis of said supply chamber to control the amount of liquid retained in each measuring chamber, and a rotatable member for removing the filled containers and having its axis parallel to and tiltable with the axis of the supply chamber.

6. A filling machine including a supply chamber rotatable about an axis inclined in respect to the vertical, a plurality of conical measuring chambers each having its larger upper end opening through the bottom of said supply chamber, a valve for controlling the discharge from the smaller lower ends of said measuring chambers, means for maintaining a liquid level within said supply chamber and below the uppermost part of the path of movement of the upper ends of said measuring chambers during the rotation of said supply chamber about said inclined axis, and means for varying the inclination of the axis of said supply chamber to control the amount of liquid retained in each measuring chamber.

7. A filling apparatus including a rotatable frame having an upper supply chamber, an annular series of measuring chambers having inlet openings communicating with the interior of said supply chamber and having discharge outlets below said supply chamber, means for rotating said supply chamber about an axis inclined to the vertical, means for maintaining a liquid level in said supply chamber such that the inlet openings of said measuring chambers move below and above said liquid level during the rotation of said supply chamber about said axis, means for varying the inclination of said axis to vary the amount of liquid retained in each measuring chamber as it moves above said liquid level, and a rotatable member for removing the filled containers and having its axis parallel to and tiltable with the axis of the supply chamber.

8. A filling apparatus including a rotatable frame having an upper supply chamber, an annular series of measuring chambers having inlet openings communicating with the interior of said supply chamber and having discharge outlets below said supply chamber, means for rotating said supply chamber about an axis inclined to the vertical, means for maintaining a liquid level in said supply chamber such that the inlet openings of said measuring chambers move below and above said liquid level during the rotation of said supply chamber about said axis, means for varying the inclination of said axis to vary the amount of liquid retained in each measuring chamber as it moves above said liquid level and means for opening the discharge outlet of each chamber when the inlet is above the liquid level.

CLARENCE W. VOGT.